US011503433B2

(12) United States Patent
Mohan et al.

(10) Patent No.: US 11,503,433 B2
(45) Date of Patent: Nov. 15, 2022

(54) SYSTEM AND METHOD FOR MANAGING SENSORS

(71) Applicant: Building Robotics, Inc., Oakland, CA (US)

(72) Inventors: Tanuj Mohan, Mountain View, CA (US); William Kerry Keal, San Jose, CA (US); Jun Gao, Saratoga, CA (US)

(73) Assignee: Building Robotics, Inc., Oakland, CA (US)

( * ) Notice: Subject to any disclaimer, the term of this patent is extended or adjusted under 35 U.S.C. 154(b) by 0 days.

(21) Appl. No.: 17/184,334

(22) Filed: Feb. 24, 2021

(65) Prior Publication Data

US 2022/0272490 A1 Aug. 25, 2022

(51) Int. Cl.
*H04W 4/029* (2018.01)
*H04W 4/33* (2018.01)
*H01Q 1/24* (2006.01)

(52) U.S. Cl.
CPC ............ *H04W 4/029* (2018.02); *H01Q 1/243* (2013.01); *H04W 4/33* (2018.02)

(58) Field of Classification Search
CPC ......... H04W 4/029; H04W 4/33; H01Q 1/243
USPC ...................................................... 455/456.1
See application file for complete search history.

(56) References Cited

U.S. PATENT DOCUMENTS

| | | | |
|---|---|---|---|
| 9,462,423 B1* | 10/2016 | Rivlin | H04W 4/043 |
| 2016/0337809 A1* | 11/2016 | Narasimha | H04W 4/023 |
| 2017/0265124 A1* | 9/2017 | Seemann | H04L 12/2823 |
| 2018/0097830 A1* | 4/2018 | Shibata | H04L 67/2814 |
| 2018/0184287 A1* | 6/2018 | Khan | H04W 12/02 |

FOREIGN PATENT DOCUMENTS

| | | |
|---|---|---|
| WO | 2016064562 | 4/2016 |
| WO | 2016154320 | 9/2016 |
| WO | 2017196991 | 11/2017 |

OTHER PUBLICATIONS

PCT Search Report dated May 31, 2022, for PCT Application PCT/US2022/015013, 12 pages.

* cited by examiner

*Primary Examiner* — Hirdepal Singh

(57) ABSTRACT

There is described a system, method, and medium for managing a group of radio frequency (RF) sensors. The system comprising a first sensor, a second sensor and an upstream device. A sensor management system comprises a first sensor, a second sensor, and an upstream device. The first sensor is positioned at a first location and transmits a wireless signal. The second sensor is positioned at a second location and detects the wireless signal. The first and second locations of the first and second sensors correspond to an expected wireless signal of the first sensor. The upstream device performs an action in response to determining that a difference between the detected wireless signal and the expected wireless signal exceeds a predetermined threshold.

18 Claims, 5 Drawing Sheets

SYSTEM AND METHOD FOR MANAGING SENSORS

FIELD OF THE INVENTION

This application relates to the field of asset tracking systems and, more particularly, to a sensor management system of a group of radio frequency (RF) sensors for asset tracking.

BACKGROUND

Building management systems encompass a wide variety of equipment that aid in monitoring and controlling building operations. Building management systems often include one or more environmental control sub-systems, such as security, fire safety, lighting, heating, ventilation, and air conditioning ("HVAC") systems. The systems may also provide non-environmental control features for management and occupants of a building, such as indoor location tracking of assets (including occupants).

Sensor management systems may include sensors positioned throughout a structure to detect building activity, such as occupancy detection and asset tracking. Unfortunately, these sensors might be installed improperly, recorded inaccurately, or otherwise fail to operate according to specifications. For example, a technician may install a sensor improperly, interchange the locations of two or more sensors, or mislabel a floor or ceiling plan intended to reflect sensor locations. Sensors may also lack sufficient precision since different structures may have different objects and conditions. Besides, sensors may become misaligned or otherwise malfunction over time. After installation or whenever issues are observed, a technician is sent on-site at the structure to perform visual observations and manual tasks to identify problems and address them. Such solutions can be time-consuming, costly, and produce mediocre or even erroneous results. Detection of malfunctioning sensors or out of specification conditions also presents a challenge because of the sensor management system's statistical nature. The system's performance could deteriorate over time due to the sub-optimum performance of a small number of sensors without detection.

SUMMARY

In accordance with one embodiment of the disclosure, a sensor management system approach for asset tracking is provided. The method measures radio frequency (RF) loss between sensors, compares the measurement to an expected RF loss between the sensors, and determines whether the difference between the measured and expected values indicates a problem with one or more sensors. For example, the difference between the measured and expected values may indicate that a sensor is positioned improperly at its assigned location, recorded inaccurately by a corresponding area plan, or operating incorrectly. When a problem with a sensor is indicated, then there are a number of actions that may be taken to compensate for the differential and/or address issues associated with the differential.

One aspect is a sensor management system comprising a first sensor, a second sensor, and an upstream device. The first sensor is positioned at a first location and transmits a wireless signal. The second sensor is positioned at a second location within a reception range of the wireless signal, and the second sensor detects the wireless signal. The first and second locations of the first and second sensors correspond to an expected wireless signal of the first sensor. The upstream device is configured to perform an action in response to determining that a difference between the detected wireless signal and the expected wireless signal exceeds a predetermined threshold.

Another aspect is a method of a sensor management system. The first location of the first sensor and the second location of the second sensor are identified. The first and second locations of the first and second sensors correspond to an expected wireless signal of the first sensor. A wireless signal is transmitted from the first sensor. The wireless signal is detected at the second sensor, the second location being within a reception range of the wireless signal. The upstream device performs an action in response to determining that a difference between the detected wireless signal and the expected wireless signal exceeds a predetermined threshold.

Yet another aspect is a sensor management system comprising a first sensor, a second sensor, and an upstream device. The first sensor is positioned at a first location and transmits multiple wireless signals. The second sensor is positioned at a second location within a reception range of the wireless signals, and the second sensor detects some or all of the wireless signals. The upstream device is configured to perform an action in response to determining that a difference between a detected statistical feature and an expected statistical feature exceeds a predetermined threshold. The detected statistical feature is based on at least some of the wireless signals. The expected statistical feature is based on first and second locations of the first and second sensors, and the expected statistical feature is determined independent of the wireless signals.

Still another aspect is a method of a sensor management system. The first location of the first sensor and the second location of the second sensor are identified. The first and second locations of the first and second sensors correspond to an expected statistical feature of the first sensor. Multiple wireless signals are transmitted from the first sensor, and the second location is within a reception range of the wireless signals. Some or all of the wireless signals are detected at the second sensor. A detected statistical feature is determined based on at least some of wireless signals. An expected statistical feature is determined based on the first and second locations of the first and second sensors, and the expected statistical feature is determined independent of the wireless signals. The upstream device performs an action in response to determining that a difference between the detected statistical feature and the expected statistical feature exceeds a predetermined threshold.

The above described features and advantages and others will become more readily apparent to those of ordinary skill in the art by reference to the following detailed description and accompanying drawings. While it would be desirable to provide one or more of these or other advantageous features, the teachings disclosed herein extend to those embodiments that fall within the scope of the appended claims, regardless of whether they accomplish one or more of the advantages as mentioned above.

BRIEF DESCRIPTION OF THE DRAWINGS

For a more complete understanding of the present disclosure and the advantages thereof, reference is now made to the following descriptions taken in conjunction with the accompanying drawings, wherein like numbers designate like objects.

DETAILED DESCRIPTION

Figure 1:
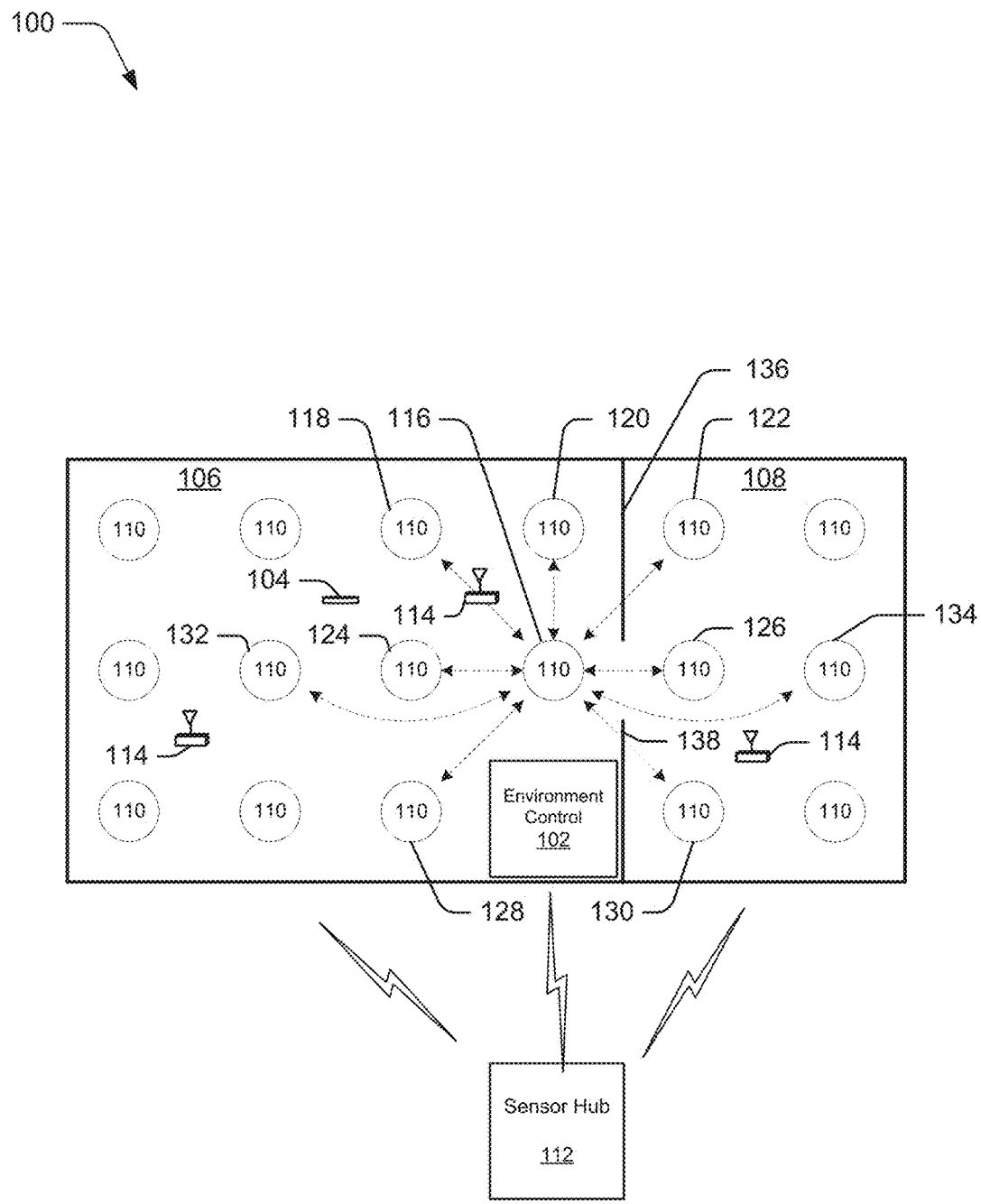
FIG. 1 is an overhead planar view of an environment in an example implementation that is operable to employ techniques described herein.

Various technologies that pertain to systems and methods that facilitate sensor management will now be described with reference to the drawings, where like reference numerals represent like elements throughout the disclosure. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is understood that functionality described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

A sensor management system of a structure, such as a building, may have devices positioned throughout the structure. Each device may be assigned to a designated location of the structure and include a radio frequency (RF) sensor. The RF sensors may communicate with each other and measure radio signal path loss from one sensor to another. Expected RF signal values between sensors are determined based on known distances between the sensors or other methods of calculating predetermined RF signal values. Measured RF signal values between sensors are determined based on RF signals transmitted from one sensor to another. Radio signal path loss is determined by a sensor or upstream device based on the difference between the measured RF signal value and the expected RF signal value. When the measured RF signal value does not match the expected RF signal value, then many actions may be taken to compensate for the differential and/or address any issues indicated by the differential.

Radio signals suffer attenuation when they travel from a transmitter to a receiver in a somewhat unpredictable way, resulting in radio signal path loss. The path loss reduces the power density of an electromagnetic wave as it propagates through an environment. The path loss may occur as a result of traveling through free space, atmospheric conditions, and intermediate objects and reflecting from surrounding objects. For example, in free space, signals diminish in intensity as they propagate away from the transmitter. A structure such as a building environment, walls, furniture, equipment, people, and other obstructions may reflect or absorb, or both reflect and absorb, the radio signals. When a group of sensors is installed in a specific environment, the sensor management system will measure all the sensors' radio signal path losses and address any issues derived from these measurements.

The radio signal path loss is a random signal. Therefore, for some embodiments, a statistical approach is sometimes necessary to get a robust characteristic of the path loss that is not transient and reflects the structural and semi-permanent environmental factors. Instead of transmitting one signal, many signals are transmitted from the sensor in a burst. The detecting or receiving sensor may or may not detect or receive all the signals transmitted. However, a large percentage of the transmitted signals may be captured. Suppose a statistically significant number of signals are captured from one burst of transmission. The individual detected or received signal values may be recorded, and the features such as the sum of the detected or received signal strength, squared sum, number of captures signals, etc., may be recorded as well. Other derivatives may be determined from these statistical features. The mean, median, mode, standard deviation, and distribution parameters of captured signals may be derived. These statistical features can then be compared with the expected statistical features to determine the sensor's condition. The expected features are determined by the structural and semi-permanent environmental factors, those deemed relevant to the sensors' accuracy, health, and operation.

Referring to FIG. 1, a sensor management system 100 for asset tracking may provide information to a building management system or other management services, such as an environmental control system 102 of a facility, to enhance services provided to building owners, managers, technicians, and occupants. For example, the system 100 may manage the environmental conditions based at least in part on the locations of beacon tags 104, such as those conditions experienced by an occupant or other asset associated with the beacon tag. The sensor management system 100 includes infrastructure 110, 112, 114 to establish locations of one or more beacon tags 104 within a structure, such as an indoor or defined space of a facility. The structure may include various partitioned or designated areas 106, 108 of the structure, such as floors, rooms, hallways, or defined open spaces associated with the structure. Each area 106, 108 of the structure may include devices of the infrastructure such as multiple sensors 110.

For some embodiments, a sensor hub 112 may be co-located with some or all sensors within an area 106, 108 of the facility. For other embodiments, the sensor hub may be remote from the sensors and/or the facility. For example, the sensor hub 112 may locate in the Cloud and communicate directly or indirectly with the sensors 110, at least in part, via the Internet or other communication network. The sensor hub 112 communicates directly or indirectly with the sensors 110, and the interconnection between the sensor hub 112 and the sensors may include wired, wireless, or both connections. Some embodiments of the sensor management system 100 may include wired or wireless gateways 114 positioned among the sensors 110 at the facility. The gateways may serve as a communication transponder between the sensor hub 112 and the sensors. Similar to sensors 110 and the sensor hub 112, the gateways 114 may also process data to employ techniques described herein.

The sensors 110 of the infrastructure may be positioned at fixed locations throughout the area 106, 108. The sensors 110 may be evenly distributed throughout each area 106, 108, or selectively distributed in a non-even manner, as may be preferred for beacon tag detection. The sensors 110 are configured to detect beacons broadcast by one or more sources associated with assets' positions. For example, occupants may carry the beacon tags 104 for detection by the sensors 110, among other purposes, to facilitate tracking of the devices. Each of the beacon tags 104 may be any type of transportable device capable of wireless communication with sensors 110 of the facility. Examples of beacon tags 104 include, but are not limited to, tags, wearables, wireless communication devices, tablets, portable computing devices, and any other type of transportable device that includes circuitry for transmitting a beacon.

As illustrated by FIG. 1, the sensor management system 100 includes multiple sensors 110 capable of communicating with each other via wireless communications, such as radio frequency (RF) signals. Examples of wireless communications include, but are not limited to, Bluetooth (including BLE), the ultrawideband (UWB), Wi-Fi (including Wi-Fi Direct), cellular, satellite, mesh networks, PAN, WPAN, WAN, Zigbee, near-field communications, and other types of radio communications and their variants. For any given sensor 110 of the system 100, a transmitting sensor 116 may be positioned at a transmitting sensor location within the structure, and one or more proximal receiving sensors 118, 120, 122, 124, 126, 128, 130 may be positioned at receiving sensor locations within the structure proximally adjacent to the transmitting sensor. For some embodiments, one or more distal receiving sensors 132, 134 may be positioned at receiving sensor locations within the structure proximally further from the transmitting sensor 116, in which one or more proximal receiving sensors 118, 120, 122, 124, 126, 128, 130 are, at least in part, between the transmitting and distal receiving sensors or otherwise closer to the transmitting sensor relative to the distal receiving sensor(s). Each sensor, and its location, is positioned within the reception range of wireless signals transmitted by one or more of the other sensors. It is to be understood that, although a specific sensor is described as a transmitting or first sensor and specific sensors are described as receiving or second sensors, all sensors of the system 100 may be transmitting and/or receiving sensors.

For the sensor management system 100, the transmitting sensor 116 may transmit one or a burst of wireless signals that may be detected or received by one or more sensors 110, such as the proximal receiving sensors 118-130, the distal receiving sensors 132-134, or both. The receiving sensors, such as the proximal or distal receiving sensors 118-134, may determine a measured wireless signal ("wireless signal") and its corresponding value based on the received wireless signals. For example, the measured wireless signal may be a received signal strength indicator (RSSI) or equivalent value if one signal is transmitted, or statistical features based on multiple received signals from the transmitting sensor. Also, an expected wireless signal or expected statistical features based on the location of the transmitting sensor 116 (i.e., transmitting sensor location) and the location of the proximal and/or distal receiving sensors 118-134 (i.e., receiving sensor location) may be determined or otherwise known to the receiving sensors 118-134, a device upstream from the receiving sensor (i.e., upstream device), or both. For example, a distance between the transmitting and receiving sensors 116-134 may be determined from these sensors' location. The distance may be correlated with the expected wireless signal (RSSI, etc.) or the expected statistical features. The locations of a given pair of sensors correspond to an expected wireless signal of those sensors. Examples of the upstream device include, but are not limited to, the sensor hub 112 or the gateway 114.

For embodiments with statistical features, the statistical features based on signals detected or received by the receiving sensor 118-134 or otherwise measured by the system 100 are considered to be detected statistical features, and the statistical features determined by the system 100 are considered to be expected statistical features. The detected and expected statistical features differ in that the expected statistical features are determined independently from the detected wireless signals detected or received at the second sensor 118-134 from the first sensor 116. The methods of determining each expected statistical may be based on, but are not limited to, a known distance between the first and second locations, a floor plan associated with the first and second sensors, or from a predetermined lookup table associated with the first and second sensors.

Statistical features attempt to characterize the distribution of received wireless signals. Received statistical features and expected statistical features include primary statistical features and derived statistical features. Primary statistical features include, but are not limited to, a number of received wireless signals, a sum of received wireless signals, a squared sum of received wireless signals, and a combination of received signals from the wireless signals. Derived statistical features includes, but are not limited to, mean, standard deviation, mode, median, minimum, and maximum values of the received wireless signal. The derived statistical features may be derived or calculated from the primary statistical features. For some embodiments, the division of primary and derived statistical features may be considered to be somewhat artificial for the main purpose of reducing bandwidth. For example, primary statistical features may be computed at one or more sensors and transmitted to an upstream device, and derived statistical features may be calculated based on the primary statistical features to describe the statistical distribution of the wireless signals. Where concerns about bandwidth are minimal, received wireless signals may be transmitted from multiple sensors to the upstream device(s) such that all, or a significant portion, of the statistical analysis may be performed upstream.

Statistical features may be determined at a receiving sensor and/or an upstream device. In particular, received or other statistical features may be determined at a receiving or second sensor 118-134, a gateway 114, the sensor hub 112, in the Cloud, or a combination of these entities. In addition, the received wireless signals or a signal based on the received wireless signals may be provided to the upstream device (such as the sensor hub 112 and/or gateway 114) to determine the primary and/or derived statistical feature or features. For example, primary statistical features may be determined at a receiving sensor, and derived statistical features may be determined at the upstream device. Division and coordination of statistical feature operations may be utilized to minimize network traffic and reduce chances of transmitting errors.

The upstream device 112, 114 may be configured to determine that a difference between the measured wireless signal ("wireless signal") and the expected wireless signal, and/or their corresponding values, exceeds predetermined thresholds and take specific actions. The actions include, but are not limited to, providing a notification to a remote device, communicating signals between sensors, or performing follow-up actions to determine the differential between the signal values. For one embodiment, the upstream device 112, 114 may notify a mobile device associated with a technician or a control center of a building management system to investigate the sensors associated with the abnormal signal value differential. For another embodiment, the upstream device 112, 114 may instigate further communications between the sensors 116-134, beyond the previously communicated wireless signals from the transmitting sensor to the receiving sensor. For example, the transmitting sensor 116 may transmit wireless signals to other sensors (whether a proximal or distal receiving sensor 118-134) associated with the signal value differential, or vice versa. In doing so, the system may determine whether either sensor locates at an expected location relative to the other sensor, corresponds to a location indicated by a floor or ceiling plan, or otherwise operates as expected. A non-RF signal, such as a light or audio-based signal, may be used for further communication to compensate for any RF signal's inadequacies previously communicated between the sensors. For yet another embodiment, the upstream device 112, 114 may identify an obstruction between the sensors 116-134, such as a structural object, a movable object, or a live object. Examples of a structure object include a wall, partition, or overhang; examples of a movable object include furniture, equipment, or personal items; and examples of live objects include humans, bugs, and other animals. For yet another embodiment, the upstream devices 112, 114, or other may identify that one or more sensors in the environment 106, 108 are malfunctioned, out of calibration, or otherwise transmitting or receiving signals abnormally. These sensors need to be reset, recalibrated, serviced or replaced to maintain the system's integrity.

The sensor management system 100 may identify obstructions within the structure, such as the structural objects, movable objects, and live objects described above. By determining that a difference between the measured wireless signal and the expected wireless signal, and/or their corresponding values, exceeds a predetermined threshold, the upstream device 112, 114 may determine that an obstruction exists between the transmitting sensor 116 and the receiving sensor (such as the proximal receiving sensor 118-130 or the distal receiving sensor 132-134). For example, as illustrated in FIG. 1, a first obstruction 136 may exist between the transmitting sensor 116 and the receiving sensor 122. A second obstruction 138 may exist between the transmitting sensor 116 and the receiving sensor 130. The signal value differential may indicate the obstruction(s) 136, 138, and the upstream device 112, 114 may take the appropriate response.

The sensor management system 100 may expect one or more obstructions within the structure, particularly if indicated by a floor or ceiling plan. By determining that a difference between the measured wireless signal and the expected wireless signal exceeds a predetermined threshold, the upstream device 112, 114 may determine that it is contradictory that the obstruction does exist between the transmitting sensor 116 and the receiving sensor (such as the proximal receiving sensor 118-130 or the distal receiving sensor 132-134) in a situation where the obstruction should exist. For example, as illustrated in FIG. 1, a first obstruction 136 may exist between the transmitting sensor 116 and the receiving sensor 122. A second obstruction 138 may exist between the transmitting sensor 116 and the receiving sensor 130, or both. The signal value differential may indicate a lack of the obstruction(s) 136, 138 (i.e., fail to indicate the existence of the obstruction), which may be caused, for example, by misplacement of sensors or incorrectly mapping of a sensor on a floor or ceiling plan. In response, the upstream devices 112, 114 may take appropriate actions.

A sensor might demonstrate signal differentials between measured wireless signal and expected wireless signal, explained above, that exceed the thresholds, or otherwise determined as abnormal, consistently when multiple sensors are transmitting while the sensor is receiving. That might indicate the sensor's receiving capability is abnormally comparing to the specification. When a sensor is transmitting, other sensors might demonstrate signal differentials that exceed the thresholds or otherwise be determined as abnormal. That behavior might indicate the transmitting capability is abnormal. In these cases, the upstream devices 112, 114 might also take appropriate actions.

Figure 2:
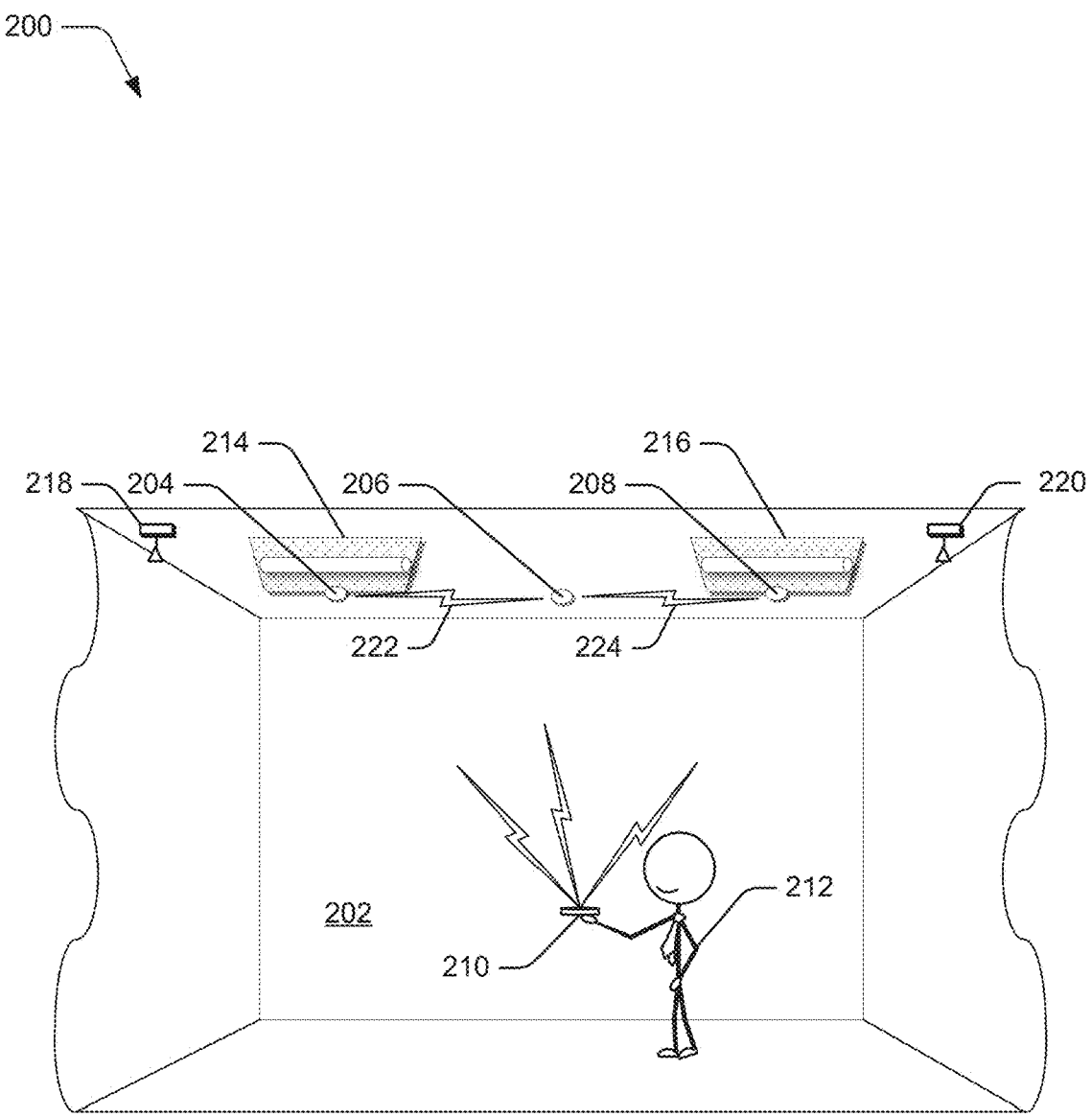
FIG. 2 is a side planar view of another environment in an example implementation that is operable to employ techniques described herein.

Referring to FIG. 2, there is shown an example implementation 200 as applied to an area 202 of the structure to illustrate an aspect of the sensor management system 100. For the example implementation 200, area 202 includes sensors 204-208 positioned at various area locations. For example, as shown in FIG. 2, some sensors 204-208 may be fixed or otherwise positioned at a ceiling of area 202. For some embodiments, sensors 204-208 may be fixed or otherwise positioned at other parts of the area, such as a wall, partition, furniture, or floor, of area 202. The example implementation 200 also shows a beacon tag 210 associated with an occupant 212 of the structure. The sensors 204-208 are positioned in area 202 to receive broadcast beacons effectively and efficiently from beacon tags 210.

For some embodiments, environmental devices may be installed in area 202. For example, one or more light fixtures 214 and 216 may be located at a ceiling of 202. The sensors 204-208 may be co-located with the environmental devices or positioned independently of them. Examples of environmental devices include, but are not limited to, light fixtures 214, 216, air vents, window blinds/shades, smoke detectors, security cameras, and the like.

The sensor management system 100 may optionally include one or more wired or wireless gateways 218, 220 positioned among the sensors 204-208 at the structure. For these particular embodiments, each wired or wireless gateways 218, 220 may serve as a communication transponder between the sensor hub 112 (shown in FIG. 1) and select sensors.

The sensors 204-208 of the sensor management system can communicate with each other via RF communications 222, 224. Based on such communications 222, 224, the sensors 204-208 may measure radio signal path loss from one sensor to another. Communications may occur between adjacent sensors, such as a transmitting sensor 204 and a proximal receiving sensor 206, and/or communication may occur between sensors further apart, such as the transmitting sensor 204 and a distal receiving sensor 208.

An expected RF signal value, or expected statistical features, and a measured RF signal value, or statistical features computed from multiple detected or received RF signal values may be established for each pair of sensors. The expected RF signal value or expected statistical features between sensors may be determined based on a known distance between the sensors. The expected RF signal value or expected statistical features may be determined by other methods of calculating predetermined RF signal values, such as a previous measurement of the RF signal value. For some embodiments, the above mentioned expected values may also be determined by a lookup table established prior. For some embodiments, the expected RF signal value or expected statistical features may include considering any known obstructions between the sensors. The measured RF signal value or statistical features between sensors may be determined based on an RF signal transmitted from one sensor and received by another sensor. The measured RF signal value or statistical features may be determined from the received RF signals based on a predetermined table stored at the receiving sensor or an upstream device or based on a predetermined process that considers propagation properties (including free space propagation, atmospheric conditions, or both) of the environment proximal to the sensors as well as any intermediate objects located between them.

Radio signal path loss may be determined by a sensor or an upstream device based on a difference of the measure RF signal value or computed statistical features from multiple transmitted signals and the expected RF signal value or expected statistical features. A nominal difference between the measure RF signal value or statistical features and the expected RF signal value or expected statistical features may merely reflect normal operating conditions, but the difference larger than an established threshold may indicate an issue with a sensor or a plan used to track or otherwise identify the sensor. When the measured RF signal value or statistical features does not match the expected RF signal value or expected statistical features within a tolerable difference, several actions may be taken to either compensating or otherwise address the issues caused by the differential.

Figure 3:
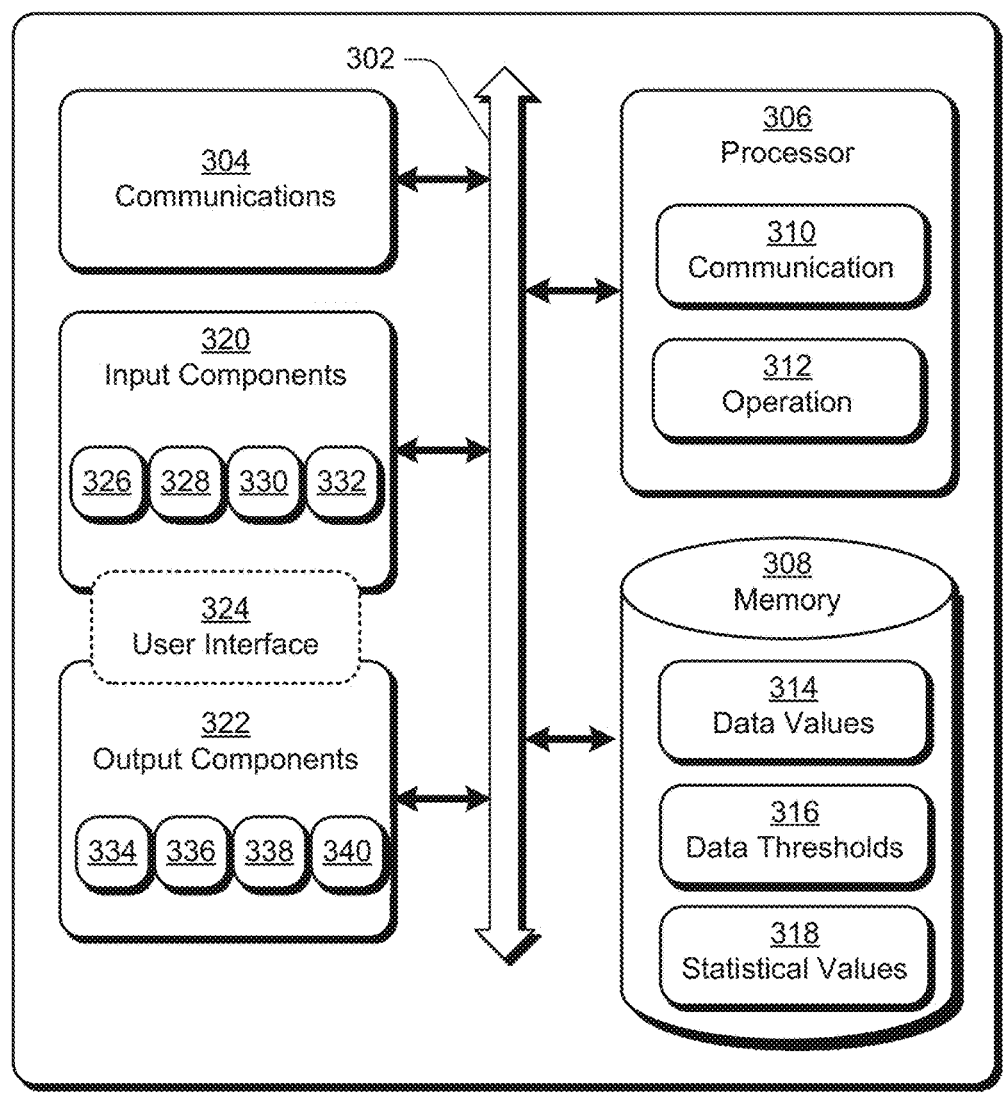
FIG. 3 is a block diagram of example components of a sensor of FIG. 1 or FIG. 2.

FIG. 3 represents example device components 300 of a sensor, such as a sensor 110, 204-208 of the sensor management system 100, for asset tracking of beacon tags. The device components 300 of the sensor comprise a communication bus 302 for interconnecting other device components directly or indirectly. The other device components include one or more communication components 304 communicating with other entities via a wired or wireless network, one or more processors 306, and one or more memory components 308.

The communication component 304 of the sensor is configured to communicate with another sensor's communication component and receive a beacon broadcast from a beacon tag. The communication component 304 may utilize wireless technology for communication, such as radio frequency (RF), infrared, microwave, light wave, and acoustic communications. RF communications include, but are not limited to, Bluetooth (including BLE), ultra-wideband (UWB), Wi-Fi (including Wi-Fi Direct), Zigbee, cellular, satellite, mesh networks, PAN, WPAN, WAN, near-field communications, and other types of radio communications and their variants. For some embodiments, the communication component 304 of the device components 300 may also utilize wired technology for communication, such as the transmission of data over a physical conduit, e.g., an electrical or optical fiber medium. Each sensor may include more than one communication component 304. For example, a sensor may include a communication component UN receiving, the beacon from a beacon tag, a communication component for RF communication with another sensor, and a communication component for non-RF communication with the other sensor.

The processor 306 may execute code and process data detected or received from other components of the device components 300, such as information received at the communication component 304 or stored at the memory component 308. The code associated with the sensor management system 100 and stored by the memory component 308 may include but is not limited to operating systems, applications, modules, drivers, and the like. An operating system includes executable code that controls basic functions of the sensor, such as interactions among the various components of the device components 300, communication with external devices via the communication component 304, and storage and retrieval of code and data to and from the memory component 308.

Each application includes executable code to provide specific functionality for the processor 306 and/or remaining components of the sensor. Examples of applications executable by the processor 306 include, but are not limited to, a communications module 310 to perform communication operations with other sensors, receiving the transmission from proximal beacon tags, and transmitting collected and/or calculated data to one or more upstream devices, and an operation module 312 to perform general and specific operations at the sensor. For some embodiments, the operation module 312 may determine a difference between the measured wireless signal and the expected wireless signal (or their corresponding statistical features and expected statistical feature values). The operation module 312 may also determine whether the difference exceeds a predetermined threshold.

Data stored at the memory component 308 is information that may be referenced or manipulated by an operating system or application for performing functions of the sensor. Examples of data associated with the sensor management system 100 and stored by the memory component 308 may include, but are not limited to, data values 314 such as expected wireless signals and measured wireless signals and data thresholds 316 such as the predetermined threshold to be compared with the difference between the measured and expected wireless signals. The statistical data values 318 might include, but not limited to, the number of received RF signals, the sum of the received RF signals, the sum of squared RF received signals, and possibly the individual received signal.

The device components 300 of each sensor 110, 204-208 may include one or more input components 320 and one or more output components 322. The input components 320 and output components 322 of the device components 300 may include one or more visual, audio, mechanical, or other components. For some embodiments, the input and output components 320, 322 of each sensor 110, 112, 114 may include a user interface 324 for interaction with a device user. The user interface 324 may include hardware and software to provide a user with the desired user experience. Examples of input components 320 include, but are not limited to, a light sensor 326 (such as a passive infrared sensor), audio sensor 328 (such as a microphone), motion sensor 330, atmospheric sensor 332 (such as temperature, humidity, pressure, etc.), and a combination of sensing technologies. Examples of output components 320 include, but are not limited to, displays 334, visual indicators 336, audio speakers 338, mechanical actuators 340, and a combination of output technologies.

It is to be understood that FIG. 3 is provided for illustrative purposes to represent examples of the device components 300 of a sensor 110, 204-208. It is not intended to be a complete diagram of the various components utilized by the device. Therefore, sensor 110, 204-208 may include various other components not shown in FIG. 3, may include a combination of two or more components, or a division of a particular component into two or more separate components, and still be within the scope of the present invention.

Figure 4:
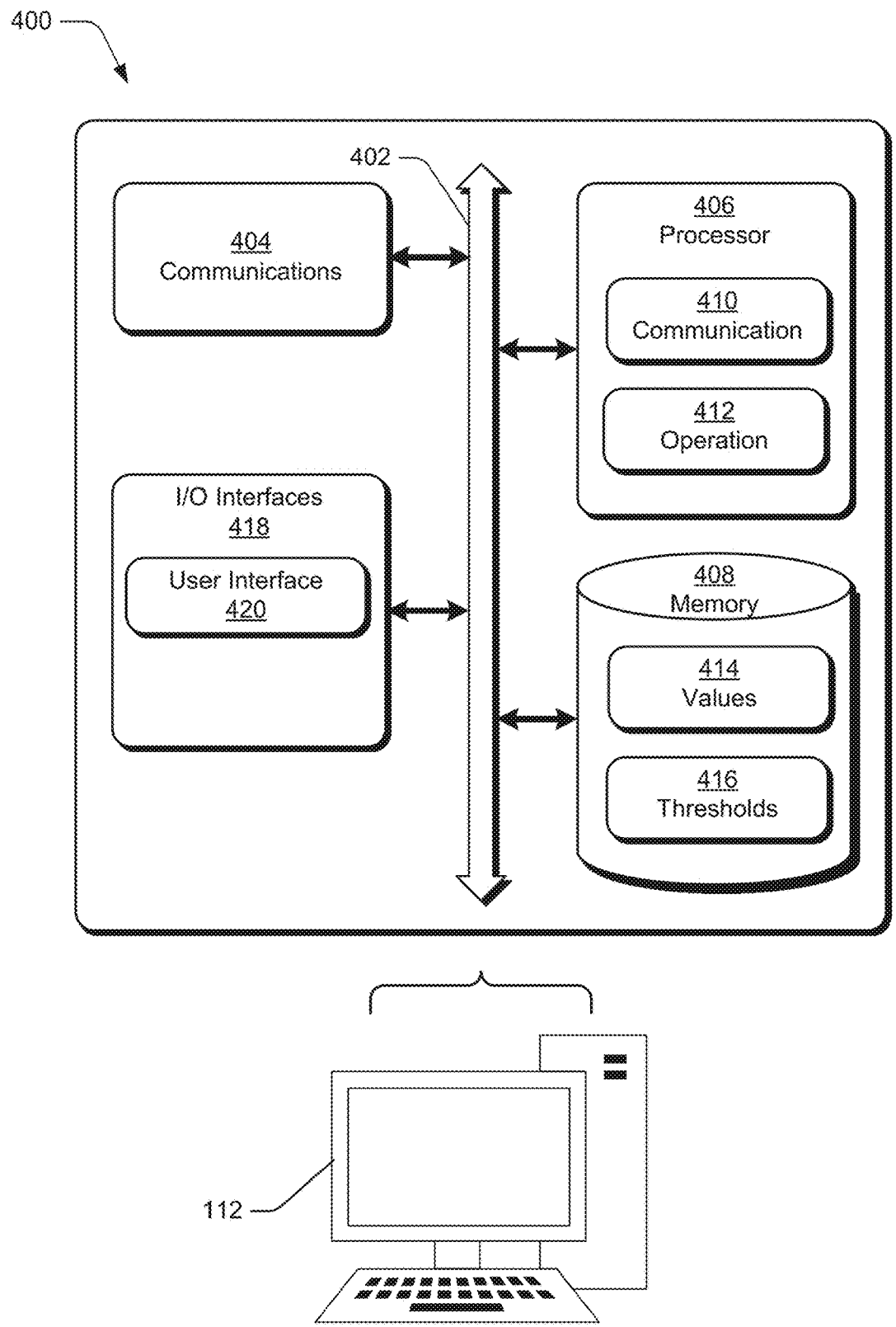
FIG. 4 is a block diagram of example components of an upstream device of FIG. 1 or FIG. 2.

FIG. 4 represents example device components 400 of an upstream device, such as the sensor hub 112 or the gateway 114 of the sensor management system 100, for asset tracking of beacon tags. The device components 400 of the upstream device 112, 114 comprise a communication bus 402 for interconnecting other device components directly or indirectly. The other device components include one or more communication components 404, communicating with other entities via a wired or wireless network, one or more processors 406, and one or more memory components 408. The communication component 404 is configured to communicate with multiple sensors 110, 204-208, either directly or via one or more other upstream devices. The communication component 404 may utilize wireless technology, wired technology, or a combination of these technologies for communication with other devices, similar to the sensors described above in reference to FIG. 3.

The processor 406 may execute code and process data detected or received from other components of the device components 400, such as information received at the communication component 404 or stored at the memory component 408. The code associated with the sensor management system 100 and stored by the memory component 408 may include, but is not limited to, operating systems, applications, modules, drivers, and the like. An operating system includes executable code that controls basic functions of the upstream device 112, 114, such as interactions among the various components of the device components 400, communication with external devices via the communication component 404, and storage and retrieval of code and data to and from the memory component 408.

Each application includes executable code to provide specific functionality for the processor 406 or remaining components of the upstream device 112, 114, or both. Examples of applications executable by the processor 406 include, but are not limited to, a communications module 410 to perform communication operations directly or indirectly with the sensors 110, 204-208. The communication operations might include receiving collected data or calculated data, or both, from the sensors, transmitting calculated results to the sensors, instructing the sensor to perform general and specific operations determined by operation model 412. For some embodiments, the operation module 412 may determine a difference between the measured wireless signal and the expected wireless signal (such as statistical features), or furthermore, to determine whether the difference exceeds a predetermined threshold.

Data stored at the memory component 408 is information that may be referenced and manipulated by an operating system or application for performing functions of the upstream device 112, 114. Examples of data associated with the sensor management system 100 and stored by the memory component 408 may include, but are not limited to, data values 414 such as expected wireless signals and measured wireless signals and data thresholds 416 such as the predetermined threshold to be compared with the difference between the measured and expected wireless signals. The data value 414 may also include information used to determine the expected wireless signals, such as a ceiling or floor plan of an area of the structure, locations of the sensors 110, 204-208, and distances between pairs of sensors.

The data value 414 may also include, but not limited to, the statistical values, such as the number of RF signal received, the sum of all received RF signals, the sum of squared RF signals. If possible, the individual received RF signal values.

The device components 400 of each upstream device 112, 114 may include one or more input and output components, i.e., I/O interfaces 418. The I/O interfaces 418 of the device components 400 may include one or more visual, audio, mechanical, or other components. For some embodiments, the I/O interfaces 418 of each upstream device 112, 114 may include a user interface 420 for interaction with a device user. The user interface 420 may include a combination of hardware and software to provide a user with the desired user experience. For example, the user interface 420 may include one or more input components to allow the user to enter information, such as mechanical buttons or audio input, and one or more output components to provide information to the user, such as a visual or audio indicator to show an operational status of the upstream device 112, 114.

It is to be understood that FIG. 4 is provided for illustrative purposes only to represent examples of the device components 400 of an upstream device 112, 114 and is not intended to be a complete diagram of the various components that the device may utilize. Therefore, upstream devices 112, 114 may include various other components not shown in FIG. 4, may include a combination of two or more components, or a division of a particular component into two or more separate components, and still be within the scope of the present invention.

Figure 5:
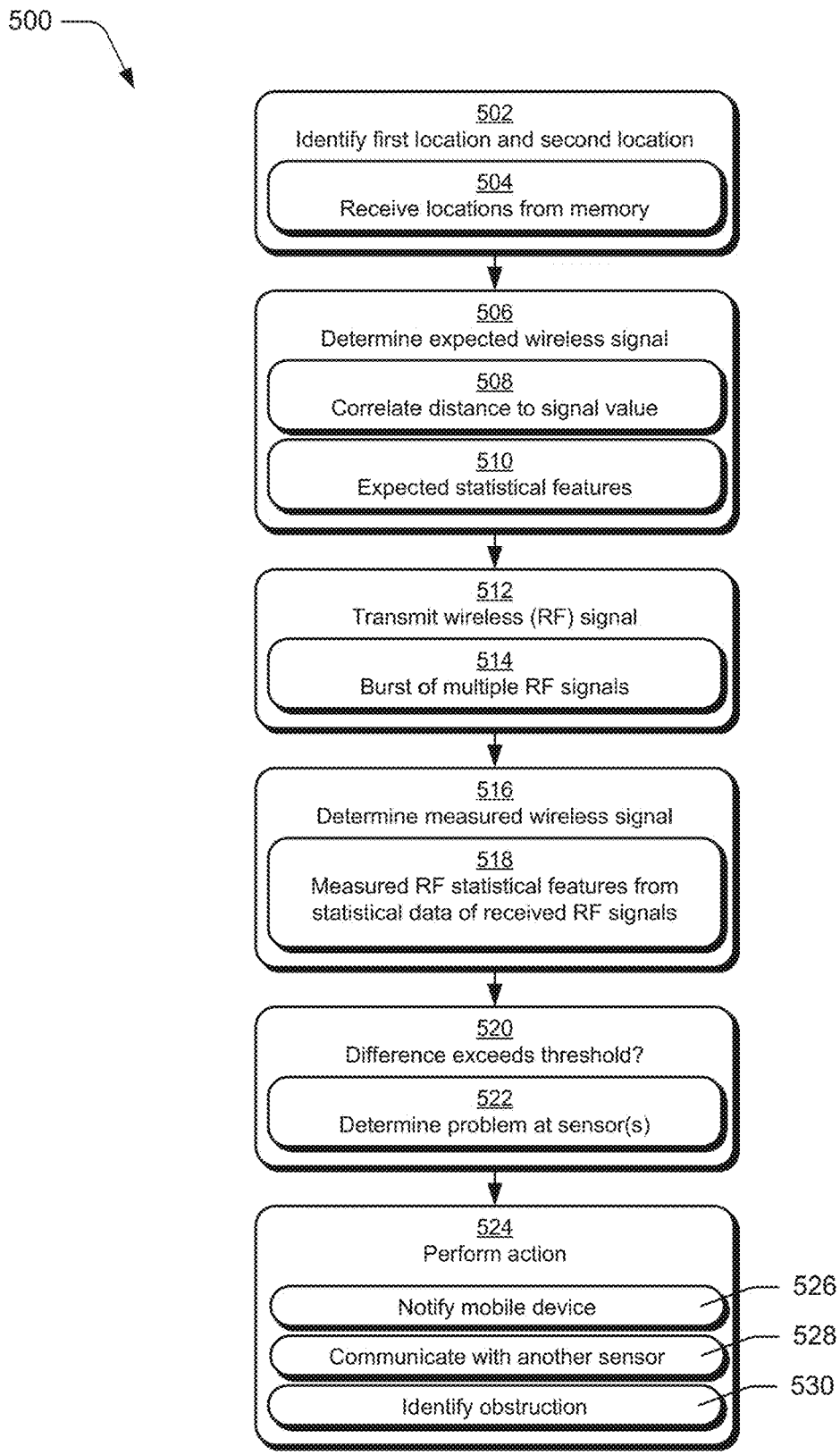
FIG. 5 is a flow diagram of an example operation of a system that includes the sensors and upstream device(s) of FIG. 1 and/or FIG. 2 with a single RF transmission signal analytical processing model.

Referring to FIG. 5, a flow diagram represents an example system operation 500 of the sensor management system 100. For the operation 500 of a sensor management system, the first sensor's first location is identified within a structure. The second location of a second sensor is identified within the structure (502). For example, the first sensor may be a transmitting sensor 116, 204, and the second sensor may be a receiving sensor 118-134, 206-208. Likewise, the first location may be a transmitting sensor location, and the second location may be a receiving sensor location. The first and second sensors' locations may be stored in a sensor's memory component, an upstream device, or multiple devices (504). For some embodiments, The first and second sensors' locations may be identified and stored during, or soon after, positioning the first and second sensors at the structure. For example, The first and second sensors' locations may be recorded at a ceiling or floor plan prepared during or after installing the first and second sensors. It is to be noted that, for some embodiments, the ceiling or floor plan may not identify the correct first or second location, which is one of the issues that may be corrected or otherwise addressed by the sensor management system 100.

After the first and second sensors' locations are identified (502), operation 500 then determines an expected wireless signal based on the first and second locations of the first and second sensors (506). The expected wireless signal may be determined at a sensor, an upstream device, or a combination of devices. For example, a distance between the first and second sensors may be determined based on the first and second locations. The expected wireless signal may be determined from that distance. For some embodiments, the expected wireless signal may be correlated with the distance between the sensor locations (508). For example, the system corresponds the first and second sensors' locations to an expected wireless signal from the first sensor to the second sensor. The expected wireless signal may be stored at a memory component of one or more sensors, upstream devices, or a combination of sensors and upstream devices. As described above, the expected wireless signal may include statistical features for some embodiments (510).

Next, for operation 500, a first sensor transmits a wireless signal (512) by the first sensor that may be detected or received by one or more other sensors (i.e., the second sensor) within the reception range of the wireless signal, such as 118-134 proximal receiving sensor a distal (shown in FIG. 1). For some embodiments, the wireless signal may be part of a burst of multiple signals with a predetermined number (514), which the other sensor or sensors may receive. Operation 500 may then determine a measured wireless signal based on the second sensor's wireless signal (516). For example, the first sensor may transmit an RF signal or a burst of RF signals. The second sensor may receive the RF signal or multiple RF signals to determine the measured wireless signal. For example, the second sensor may determine the measured wireless signal based on the wireless signal that it receives and forward the measured wireless signal to one or more upstream devices. For some embodiments, the measured wireless signal may be, or be included as part of, measured RF statistical features from statistical data of the detected or received RF signals (518).

Operation 500 then determines whether a difference between the measured wireless signal and the expected wireless signal exceeds a predetermined threshold (520). The tasks of determining the difference between the measured ("wireless signal") and expected wireless signal and/or whether the difference exceeds a predetermined threshold may be performed at a sensor, an upstream device, or a combination of devices. For example, the measured wireless signal may be detected or received by the upstream device from one or more sensors. The upstream device may determine whether the difference exceeds the predetermined threshold. The upstream device may determine that one or more sensors are not positioned at their expected locations, are not appropriately recorded by a ceiling or a floor plan. The upstream device might also determine that one or more sensors are not functioning within its specification or otherwise demonstrate abnormal behaviors in RF signal transmitting and receiving (522).

Thereafter, the operation 500 performs an action at the upstream device in response to determining that the difference between the measured wireless signal and the expected wireless signal exceeds the predetermined threshold (524). Examples of actions that the upstream device may perform include, but are not limited to, notifying a mobile device associated with a technician (526), communicating a second signal different from the wireless signal from the first sensor to the second sensor (528), or identifying an obstruction between the first and second sensors (530). The upstream device may perform one or more of these actions in response to determining the signal value difference exceeds the predetermined threshold.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms. The present disclosure applies equally regardless of the particular type of instruction or signal-bearing medium, or storage medium utilized to carry out the execution. Examples of machine-usable/readable or computer-usable/readable mediums include non-volatile, hard-coded type mediums such as read-only memories (ROMs) or erasable, electrically programmable read-only memories (EEPROMs), and user-recordable type mediums such as floppy disks, hard disk drives, and compact disk read-only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A sensor management system comprising:
   a first sensor, positioned at a first location, transmitting a wireless signal;
   a second sensor, positioned at a second location, detecting the wireless signal, and the first and second locations of the first and second sensors corresponding to an expected wireless signal of the first sensor, wherein the expected wireless signal is correlated to a distance between the first and second locations; and
   an upstream device configured to perform an action in response to determining that a difference between the detected wireless signal from the first sensor and the expected wireless signal exceeds a predetermined threshold.

2. The sensor management system as described in claim 1, wherein:
   the wireless signal includes an RF signal;
   the first sensor transmits the RF signal, and the second sensor detects the RF signal; and
   the upstream device detects the RF signal, or a signal based on the RF signal, from the second sensor.

3. The sensor management system as described in claim 1, wherein the upstream device performs the action in response to determining that one or more sensors are not positioned, recorded, or operating properly.

4. The sensor management system as described in claim 1, wherein the action is at least one of notifying a mobile device associated with a technician, communicating a second signal different from the wireless signal from the first sensor to the second sensor, or identifying an obstruction between the first and second sensors.

5. A sensor management system comprising:
   a first sensor, positioned at a first location, transmitting a wireless signal;
   a second sensor, positioned at a second location, detecting the wireless signal, and the first and second locations of the first and second sensors corresponding to an expected wireless signal of the first sensor; and
   an upstream device configured to perform an action in response to determining that a difference between the detected wireless signal from the first sensor and the expected wireless signal exceeds a predetermined threshold,
   wherein the expected wireless signal is stored at a memory component of at least one of the second sensor or the upstream device.

6. A method of a sensor management system comprising:
   identifying a first location of a first sensor and a second location of a second sensor;
   corresponding the first and second locations of the first and second sensors to an expected wireless signal of the first sensor;
   correlating the expected wireless signal to a distance between the first and second locations;
   transmitting a wireless signal from the first sensor;
   detecting the wireless signal at the second sensor; and performing an action at an upstream device in response to determining that a difference between the detected wireless signal and the expected wireless signal exceeds a predetermined threshold.

7. The method as described in claim 6, further comprising detecting an RF signal, or a signal based on the RF signal, at the upstream device from the second sensor, wherein:
transmitting the wireless signal includes transmitting the RF signal from the first sensor; and
detecting the wireless signal includes detecting the RF signal at the second sensor.

8. The method as described in claim 6, wherein performing the action at the upstream device includes performing the action in response to determining that one or more sensors are not positioned, recorded, or operating properly.

9. The method as described in claim 6, wherein performing the action at the upstream device includes at least one of notifying a mobile device associated with a technician, communicating a second signal different from the wireless signal from the first sensor to the second sensor, or identifying an obstruction between the first and second sensors.

10. A method of a sensor management system comprising:
identifying a first location of a first sensor and a second location of a second sensor;
corresponding the first and second locations of the first and second sensors to an expected wireless signal of the first sensor,
storing the expected wireless signal at a memory component of at least one of the second sensor or the upstream device;
transmitting a wireless signal from the first sensor;
detecting the wireless signal at the second sensor; and
performing an action at an upstream device in response to determining that a difference between the detected wireless signal and the expected wireless signal exceeds a predetermined threshold.

11. A sensor management system comprising:
a first sensor, positioned at a first location, transmitting a plurality of wireless signals;
a second sensor, positioned at a second location, detecting at least a portion of the plurality of wireless signals; and
an upstream device configured to perform an action in response to determining that a difference between a detected statistical feature and an expected statistical feature of the first sensor exceeds a predetermined threshold, the detected statistical feature being based on the at least the portion of the plurality of wireless signals, and the expected statistical feature being based on the first and second locations of the first and second sensors and independent of the plurality of wireless signals,
wherein the expected statistical feature is determined based on at least one of a known distance between the first and second locations, a floor plan associated with the first and second sensors, or from a predetermined lookup table associated with the first and second sensors.

12. The sensor management system as described in claim 11, wherein the upstream device performs the action in response to determining that one or more sensors are not positioned, recorded, or operating properly.

13. The sensor management system as described in claim 11, wherein the action includes at least one of notifying a mobile device associated with a technician, communicating a second signal different from the wireless signal from the first sensor to the second sensor, or identifying an obstruction between the first and second sensors.

14. A sensor management system
a first sensor, positioned at a first location, transmitting a plurality of wireless signals;
a second sensor, positioned at a second location, detecting at least a portion of the plurality of wireless signals; and
an upstream device configured to perform an action in response to determining that a difference between a detected statistical feature and an expected statistical feature of the first sensor exceeds a predetermined threshold, the detected statistical feature being based on the at least the portion of the plurality of wireless signals, and the expected statistical feature being based on the first and second locations of the first and second sensors and independent of the plurality of wireless signals,
wherein the expected statistical feature is stored at a memory component of at least one of the second sensor or the upstream device.

15. A method of a sensor management system comprising:
identifying a first location of a first sensor and a second location of a second sensor;
corresponding the first and second locations of the first and second sensors to an expected statistical feature of the first sensor;
transmitting a plurality of wireless signals from the first sensor;
detecting at least a portion of the plurality of wireless signals at the second sensor;
determining a detected statistical feature based on the at least the portion of the plurality of wireless signals;
determining the expected statistical feature based on at least one of a known distance between the first and second locations, a floor plan associated with the first and second sensors, or from a predetermined lookup table associated with the first and second sensors;
determining the expected statistical feature based on the first and second locations of the first and second sensors and independent of the plurality of wireless signals; and
performing an action at an upstream device in response to determining that a difference between the detected statistical feature and the expected statistical feature exceeds a predetermined threshold.

16. The method as described in claim 15, wherein performing the action at the upstream device includes performing the action in response to determining that one or more sensors are not positioned, recorded, or operating properly.

17. The method as described in claim 15, wherein the action includes at least one of notifying a mobile device associated with a technician, communicating a second signal different from the wireless signal from the first sensor to the second sensor, or identifying an obstruction between the first and second sensors.

18. A method of a sensor management system comprising:
identifying a first location of a first sensor and a second location of a second sensor;
corresponding the first and second locations of the first and second sensors to an expected statistical feature of the first sensor;
storing the expected statistical feature at a memory component of at least one of the second sensor or the upstream device;
transmitting a plurality of wireless signals from the first sensor;
detecting at least a portion of the plurality of wireless signals at the second sensor;
determining a detected statistical feature based on the at least the portion of the plurality of wireless signals;

determining the expected statistical feature based on the first and second locations of the first and second sensors and independent of the plurality of wireless signals; and performing an action at an upstream device in response to determining that a difference between the detected statistical feature and the expected statistical feature exceeds a predetermined threshold.

\* \* \* \* \*